(12) United States Patent
Cheng

(10) Patent No.: US 9,329,752 B2
(45) Date of Patent: May 3, 2016

(54) METHOD AND DEVICE FOR DISPLAYING DETAILED MAP INFORMATION

(71) Applicant: Tencent Technology (Shenzhen) Company Limited, Shenzhen (CN)

(72) Inventor: Gang Cheng, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 270 days.

(21) Appl. No.: 14/181,335

(22) Filed: Feb. 14, 2014

(65) Prior Publication Data

US 2014/0331176 A1    Nov. 6, 2014

Related U.S. Application Data

(63) Continuation of application No. PCT/CN2013/088038, filed on Nov. 28, 2013.

(30) Foreign Application Priority Data

May 3, 2013   (CN) .......................... 2013 1 0160576

(51) Int. Cl.
*G06F 3/048*  (2013.01)
*G06F 3/0481*  (2013.01)
*G06F 3/0484*  (2013.01)

(52) U.S. Cl.
CPC ........ *G06F 3/04817* (2013.01); *G06F 3/04842* (2013.01); *G06F 3/0481* (2013.01)

(58) Field of Classification Search
CPC ..................................................... G06F 3/0481
USPC .......................................................... 715/808
See application file for complete search history.

(56) References Cited

U.S. PATENT DOCUMENTS

| | | | | |
|---|---|---|---|---|
| 8,966,390 | B2* | 2/2015 | Prehofer | H04M 1/72572 455/457 |
| 2007/0136259 | A1* | 6/2007 | Dorfman | G01C 21/26 |
| 2009/0132953 | A1* | 5/2009 | Reed, Jr. | G06F 3/0481 715/781 |
| 2011/0173576 | A1* | 7/2011 | Murphy | G06F 3/0481 715/863 |

* cited by examiner

*Primary Examiner* — William Titcomb
(74) *Attorney, Agent, or Firm* — Morgan, Lewis & Bockius LLP

(57) ABSTRACT

A method displaying information is performed at a map display device. The method includes displaying the map on a graphical user interface of the device, the displayed map including a plurality of building icons each representing a respective building; detecting a pointing input at a respective position in the displayed map; identifying a first building icon associated with the respective position in the displayed map; selectively obtaining a respective type of detailed information on the respective building represented by the first building icon for display on the map; and displaying a transparent layer over the displayed map, the transparent layer displaying the selected type of detailed information. The selectively obtaining is in accordance with a respective distance between a current location of the device and a respective location associated with the respective building represented by the first building icon.

20 Claims, 12 Drawing Sheets

METHOD AND DEVICE FOR DISPLAYING DETAILED MAP INFORMATION

RELATED APPLICATIONS

This application is a continuation application of PCT Patent Application No. PCT/CN2013/088038, entitled "METHOD AND DEVICE FOR DISPLAYING DETAILED MAP INFORMATION" filed Nov. 28, 2013, which claims priority to Chinese Patent Application No. 201310160576.X, "METHOD AND DEVICE FOR DISPLAYING DETAILED MAP INFORMATION" filed May 3, 2013, both of which are hereby incorporated by reference in their entirety.

FIELD OF THE INVENTION

The present invention relates to the field of information technologies, and in particular, to a method and a device for displaying detailed map information on a map.

BACKGROUND OF THE INVENTION

When viewing a map, a user may view more detailed information through a small window. For example, a map is displayed on a device interface and a mouse stays over a certain location on the map. When the mouse stays over an icon of China Technology Exchange Center, a prompt message window may be displayed on an icon of China Technology Exchange Center. The message may be "Click to View Details". At this time, after the user clicks the prompt message window, details about the China Technology Exchange Center are loaded and displayed in another small window. The details of China Technology Exchange Center may be information, such as bus routes, and comments of users on inside restaurants and hotels.

However, when the detailed map information is displayed through the method discussed above, the user needs to perform clicking to load and display the detailed map information, which are comparatively complex operations.

In addition, the display of the detailed information of one building in the map often blocks the view of other buildings nearby. It is desirable to have a method of flexibly moving the position of the detailed map information so that a user can view the nearby buildings easily.

Further, very often, the device has too much detailed information related to a building to be displayed in a limited space. There is a need to strategically select and display the detailed information to make the displayed information shorter and more useful for a user.

SUMMARY

The present application provides a map displaying method and apparatus to improve upon the accuracy and comprehensiveness of existing map-displaying methods.

One aspect of the invention involves a method for displaying detailed information on a map. The method is performed at a device having one or more processors and memory storing instructions for execution by the one or more processors. The method comprises: displaying the map on a graphical user interface of the device, the displayed map including a plurality of building icons each representing a respective building; detecting a pointing input at a respective position in the displayed map; identifying a first building icon associated with the respective position in the displayed map; selectively obtaining a respective type of detailed information on the respective building represented by the first building icon for display on the map, wherein the selectively obtaining is in accordance with a respective distance between a current location of the device and a respective location associated with the respective building represented by the first building icon; and displaying a transparent layer over the displayed map, the transparent layer displaying the selected type of detailed information.

One aspect of the invention involves a device. The device comprises one or more processors, memory, and one or more program modules stored in the memory and configured for execution by the one or more processors. The one or more program modules including instructions for performing the method described above. Another aspect of the invention involves a non-transitory computer readable storage medium having stored thereon instructions, which, when executed by a mobile device, cause the mobile device to perform the method described above.

Various other aspects and advantages of the invention are apparent in light of the descriptions below.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. The accompanying drawings in the following description are only some embodiments of the present invention, and persons of ordinary skill in the art can derive other drawings from the accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details.

The technical solution of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
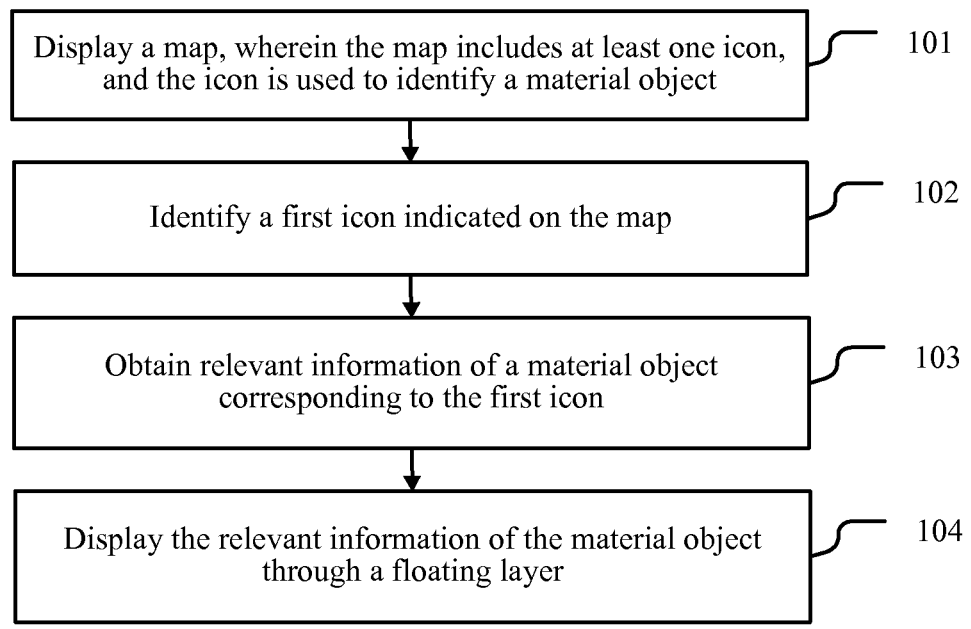
FIG. 1 is a flowchart of a map displaying method in accordance with some embodiments.

The embodiments of the present invention provide a method for displaying detailed information in a map, and the method is executed by a device. Specifically, the device may be a computer, a smartphone, a tablet computer, a personal digital assistant, portable personal computer, etc. As shown in FIG. 1, the method includes the following steps.

Step 101: Display a map, wherein the map includes at least one icon, and the icon is used to identify a material object. For example, the material object can be a building, a park, a street, a business establishment, an apartment complex, a police station, a fire station, a monument, a public square, a landmark, etc.

For example, when the device is turned on and a map service is started, the map is presented on a display interface of the device. Further, a user may zoom in or zoom out the map displayed currently according to demands of the user, so as to clearly display a location that the user intends to view.

It should be noted that, an image is displayed in layers. In some embodiments, the map presented on the display interface of the current device is displayed in one layer.

In some embodiments, the meaning of a layer in this application includes a meaning of a layer in a graphics program such as Photoshop™. Many effects may be achieved through layers. Layers are like films with elements, such as words or figures. Final effects of an image are achieved by combining the layers which are stacked up in sequence. Layers may accurately position the element on the page. For example, the layer may accurately position the icon(s) on the map. In addition, a text, a picture, a table and a plug-in unit may be added into the layers. In some embodiments, one layer may also be nested into another layer.

Optionally, the map includes multiple building icons. For example, the map includes building icons corresponding to multiple buildings. A map of Haidian District, Beijing may include an icon of China Technology Exchange Center, an icon of Ideal International Plaza, an icon of China Putian Plaza, and the like.

Step 102: Identify an icon indicated on the map.

Optionally, the identifying the icon indicated on the map includes: identifying an icon corresponding to a location where a mouse or another pointing device (e.g., a finger) stays (e.g., hovers) in the map; or, identifying an icon on the map which is determined by the user through a pointing input (e.g., a clicking input, tap input, or hovering input). In a mobile device, the user can indicate the icon of interest using a finger staying at or hover above the screen at the position of the icon for a preset time.

Optionally, the location where the position of the pointing input in the map may be identified first, and the position may be indicated in a form of a set of coordinates. Then, positioning may be performed in the map according to the position of the pointing input. A location of the obtained coordinates in the map is determined in the current map, and an icon at or near this location is obtained according to the determined location. For example, the icon may be the icon of China Technology Exchange Center.

Step 103: Obtain relevant information of a material object corresponding to the icon.

Optionally, the detailed relevant information of the material object includes at least one kind of the following information: an address, a bus route, a user comment, and an advertisement of the material object. For example, the obtained relevant information of the material object corresponding to the icon is an address of China Technology Exchange Center—No. 66, North Fourth Ring West Road, Haidian District, Beijing, bus routes—nearby buses No. 209, 26, and so on, a user comment made by a user on a nearby restaurant or hotel, and an advertisement regarding discount information of a nearby department store. The relevant information of the material object may be other information relevant to the material object.

Step 104: Display the detailed relevant information of the material object through a floating layer.

In the embodiment, the displaying the relevant information of the material object through the floating layer may be implemented by adopting the following manners.

In some embodiments, a transparent layer is used to display the relevant information of the material object. It should be noted that, the transparent layer is overlaid on top of the layer which contains the map.

In some embodiments, the relevant information of the material object is displayed in the form of a floating window. The layer may be replaced with a layer similar to a floating window advertisement, to display the relevant information of the material object.

The embodiments of the present invention provide the method for displaying the detailed map information, and the method includes: displaying the map, wherein the map includes at least one icon which is used to identify a material object; identifying a first icon indicated on the map by the user; obtaining the detailed relevant information of the material object corresponding to the identified icon; and displaying the detailed relevant information of the material object through a floating layer overlaid on top of the layer containing the map. Compared with the prior art method discussed in the Background, the solution provided in the embodiment of the present invention may automatically display detailed information of a building on a map corresponding to a position of a pointing input, thereby lowering complexity of the operations.

Figure 2:
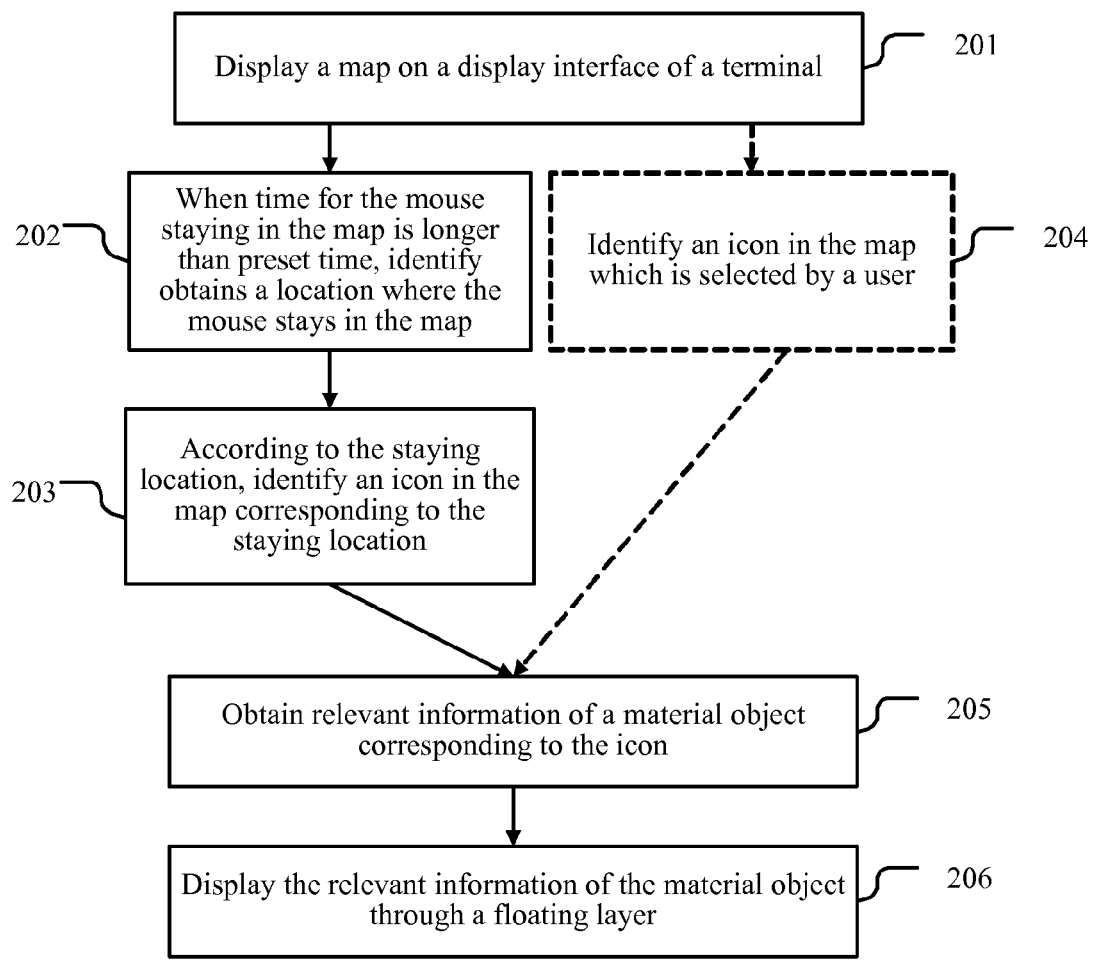
FIG. 2 is a flowchart of a map displaying method in accordance with some embodiments.

Some embodiments of the present invention provide another method for displaying detailed information in a map. As shown in FIG. 2, the method includes the following steps.

Step 201: Display a map on a display interface of a device.

Optionally, when the device is turned on and a map service is started, the map is presented on the display interface of the device. Further, a user may zoom in or zoom out the map displayed currently according to demands of the user, so as to clearly display a location that the user intends to query.

Optionally, the map includes at least one icon, and the icon is used to identify a material object. For example, the icon is used to identify a building, a park, a plaza, a business establishment, etc.

Figure 3:
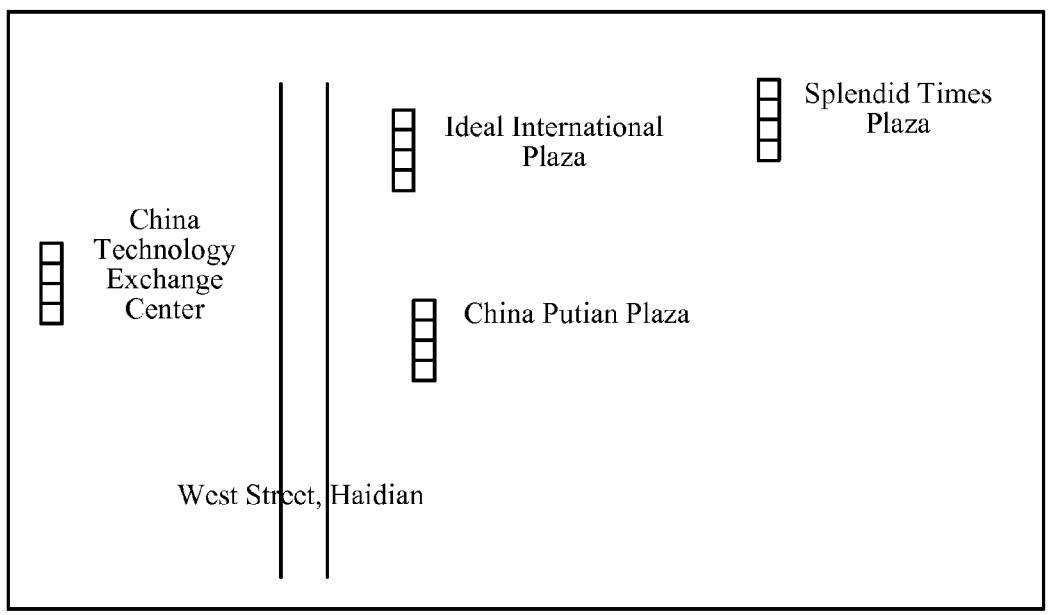
FIG. 3 is a map displayed by a device in accordance with some embodiments.

As shown in FIG. 3, a schematic diagram of a part of a map of Haidian District, Beijing is displayed on the display interface of the device, and the map of Haidian District, Beijing includes an icon of China Technology Exchange Center, an icon of Ideal International Plaza, an icon of China Putian Plaza, and the like.

Step 202: When the time that the mouse pointer staying still on the map is longer than preset time, obtain a location where the mouse pointer stays on the map.

Optionally, the device may actively capture, in the map, the staying location of the mouse pointer of the user, for example, when the mouse pointer of the user stays over the icon of China Technology Exchange Center, the device obtain the location where the mouse pointer stays at the moment.

Optionally, the preset staying time of the mouse pointer of the user may be determined according to a specific product strategy. For example, the preset time may be any value ranging from 0 second to 1 second. If the preset time is 0.5 second, when the time for the mouse staying still is longer than 0.5 second, the device obtains the location where the mouse pointer stays in the map at this moment. Optionally, the location where the mouse pointer stays in the map may be indicated in a form of coordinates.

Optionally, when the time for the mouse staying in the map is shorter than the preset time, that is, the mouse does not stay over a certain location in the map, a map seen by the user is identical with the map displayed in step 201.

Step 203: Identify an icon in the map corresponding to the staying location.

Optionally, according to the coordinates of the staying location of the mouse, the icon at the coordinate location in the map is identified. For example, the icon determined according to the staying location of the mouse is the icon of China Technology Exchange Center.

In some embodiments, when the device is a computer, the user may directly operate the mouse to move on the map. In some embodiments, when the device is a mobile device having a touch screen, such as a phone or a tablet personal computer, the user may directly touch a certain icon on the map on the screen, so that the device identifies an icon corresponding to a position where the user touches, as described in step 204.

Step 204: Identify an icon in the map which is selected by the user (e.g., through a pointing input using the mouse or a contact on the touch screen).

When the user selects a certain icon on the map, it may be directly determined that the location of the user's pointing input is the material object corresponding to the icon. Optionally, when the location of the user's pointing input is not precisely on any icon, that is, when the location where the user's pointing input is near one or more icons on the map, the device may determine, through calculation, an icon nearest the location of the pointing input as the icon selected by the user.

It should be noted that, step 202—step 203 and step 204 are two parallel manners of identifying the icon selected by the user. In FIG. 2, dotted boxes are used to indicate step 204, so as to indicate that this step is an optional or alternative step to steps 202-203. Certainly, the dotted boxes may further be used to indicate step 202 and step 203, so as to indicate that the two steps are optional steps. The foregoing indicating manner of indicating coordinate steps is not limited according to the present invention.

Step 205: Obtain detailed relevant information of the material object corresponding to the selected icon.

Optionally, the relevant information of the material object may be an address, a bus route, a user comment, and an advertisement of the material object. For example, the obtained relevant information of the material object corresponding to the icon is an address of China Technology Exchange Center—No. 66, North Fourth Ring West Road, Haidian District, Beijing, bus routes—nearby buses No. 209, 26, and so on, a user comment may be a comment made by a user on a nearby restaurant or hotel, and an advertisement may be discount information of a nearby department store or store. Certainly, the relevant information of the material object may further be other information relevant to the material object.

Figure 4:
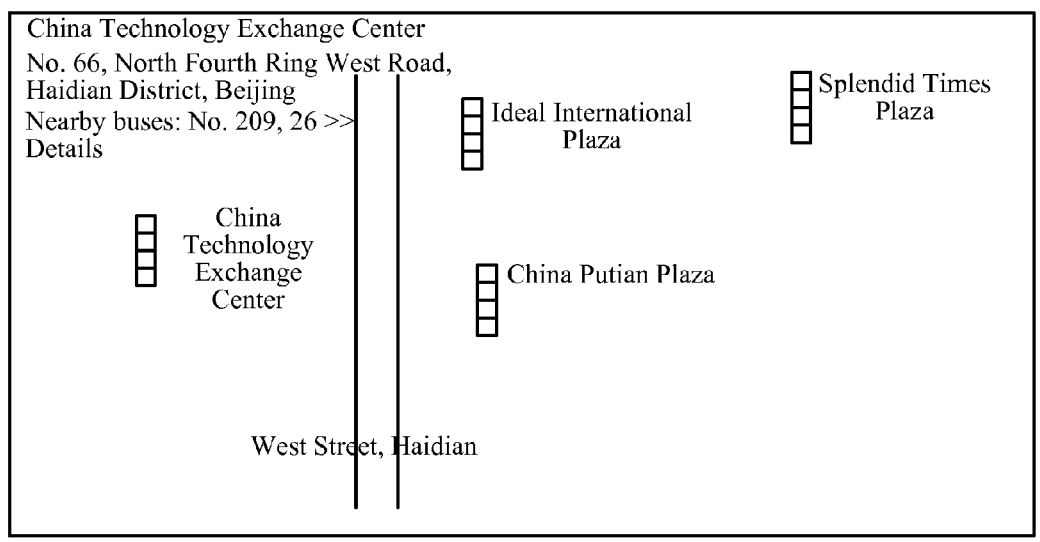
FIG. 4 is a map displayed by a device in accordance with some embodiments.

Further, optionally, when more detailed relevant information of the material object needs to be queried, the "Details" link within the detailed relevant information of the displayed material object may be clicked, as shown in FIG. 4.

Optionally, when obtaining the detailed relevant information of the material object corresponding to the icon, the detailed relevant information of the material object stored in a local storage device may be obtained; or a request message may be sent to a server from the device. In some embodiments, the request message includes an identifier of the icon and is used by the server to acquire the detailed relevant information of the material object corresponding to the icon. When the detailed relevant information of the material object corresponding to the icon has been located, the server sends a request response message to the device, wherein the request response message includes the detailed relevant information of the material object corresponding to the icon queried and obtained by the server.

Step 206: Display the detailed relevant information of the material object through a floating layer.

In some embodiments, the icons are displayed in a first layer, and the relevant information of the material object is displayed on a second layer. Optionally, the relevant information of the material object is displayed on a transparent layer, and the transparent layer is superimposed upon the layer containing the map. As shown in FIG. 4, near the icon of China Technology Exchange Center in the map, the transparent layer is used to display an address of China Technology Exchange Center—No. 66, North Fourth Ring West Road, Haidian District, Beijing, bus routes—nearby buses No. 209, 26, and so on.

Figure 5:
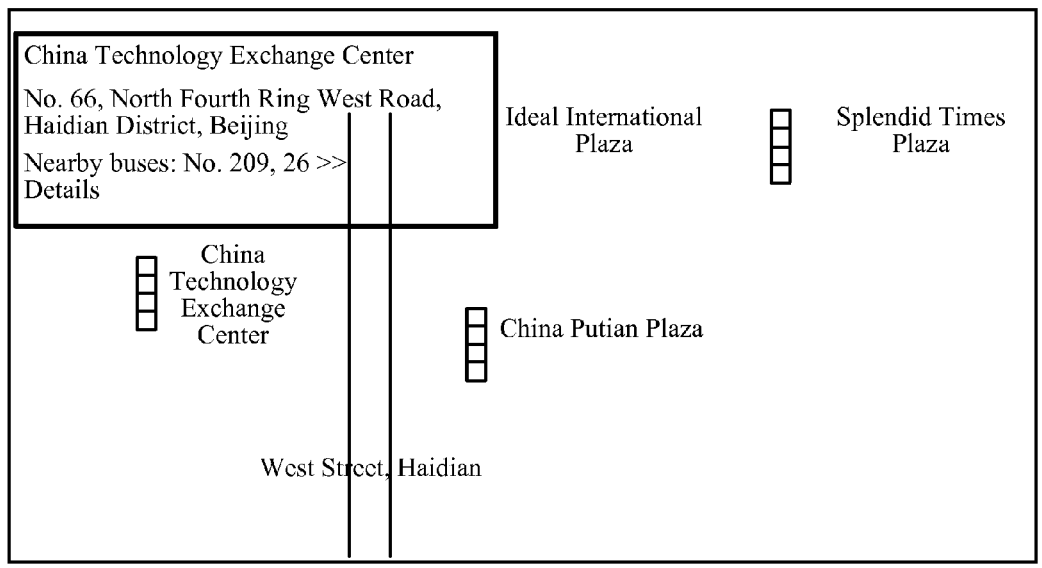
FIG. 5 is a map displayed by a device in accordance with some embodiments.

In some embodiments, the relevant information of the material object is displayed in the form of a floating window. As shown in FIG. 5, near the icon of China Technology Exchange Center in the map, the floating window is used to display the address of China Technology Exchange Center—No. 66, North Fourth Ring West Road, Haidian District, Beijing, bus routes—nearby buses No. 209, 26, and so on.

Further, optionally, a location relationship between the relevant information of the displayed material object and the icon may be described in the following: displaying the relevant information of the material object above the icon; displaying the relevant information of the material object below the icon; displaying the relevant information of the material object on a left side of the icon; displaying the relevant information of the material object on a right side of the icon; or superimposing the relevant information of the material object upon the icon.

It should be noted that, in some embodiments, the location relationship between the relevant information of the displayed material object and the icon may be determined according to actual conditions. For example, when the icon is located at a lower end of the displayed map in the display interface of the device, the relevant information of the material object may be displayed above the icon. When the icon is located at an upper end of the displayed map in the display interface of the device, the relevant information of the material object may be displayed below the icon. When the icon is located at a left end of the displayed map in the display interface of the device, the relevant information of the material object may be displayed on the right side of the icon. When the icon is located at a right end of the displayed map in the display interface of the device, the relevant information of the material object may be displayed on the left side of the icon. Certainly, the relevant information of the material object may be displayed according to other conditions, such as the location of the mouse, so that the user may clearly view the relevant information of the material object corresponding to the icon.

Some embodiments of the present invention provide the method for displaying the detailed map information, and the method includes: displaying the map, wherein the map includes at least one icon, and the icon is used to identify the material object; identifying a first icon indicated on the map by the user; obtaining detailed relevant information of the material object corresponding to the first icon; and displaying the detailed relevant information of the material object through a floating layer. The solution provided in the embodiments of the present invention may automatically display detailed information of a building in a map corresponding to a staying location of a pointing input, simplifying the operations and thereby improving user experience.

Figure 6:
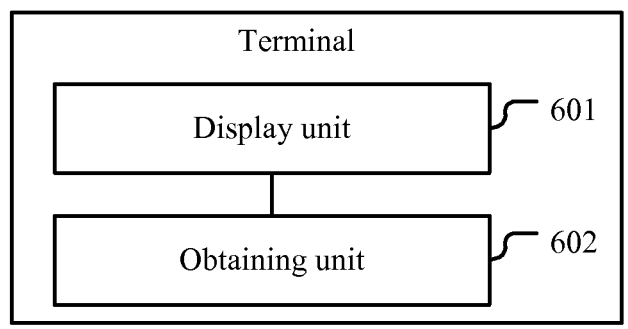
FIG. 6 is a schematic structural diagram of a map displaying device in accordance with some embodiments.

Some embodiments of the present invention provide a device for displaying detailed map information on a map. The device can be a computer, a smartphone, or a tablet personal computer, etc. As shown in FIG. 6, the device includes: a display unit 601, and an obtaining unit 602.

In some embodiments, the display unit 601 is used to display a map, wherein the map includes at least one icon, and the icon is used to identify a material object.

Optionally, when the device is turned on and a map service is started, the map is presented on a display interface of the device. Further, a user may zoom in or zoom out the map displayed currently according to demands of the user, so as to clearly display a location that the user intends to query.

In some embodiments, the obtaining unit 602 is used to identify an icon indicated on the map and displayed by the display unit.

The obtaining unit 602 is further used to obtain detailed relevant information of a material object corresponding to the icon selected by the user using the pointing input.

In some embodiments, the relevant information of the material object includes an address, a bus route, a user comment, and an advertisement of the material object. For example, the obtained relevant information of the material object corresponding to the icon is an address of China Technology Exchange Center—No. 66, North Fourth Ring West Road, Haidian District, Beijing, bus routes—nearby buses No. 209, 26, and so on, a user comment may be a comment made by a user on a nearby restaurant or hotel, and an advertisement may be discount information of a nearby department store or store. Certainly, the relevant information of the material object may further be other information relevant to the material object, which is not described herein again.

In some embodiments, the display unit 601 is further used to display the detailed relevant information of the material object through a floating layer.

Further, optionally, when the obtaining unit 602 obtains the first icon displayed on the map by the display unit, the obtaining unit 602 identifies an icon corresponding to a location where the user's pointing input stays in the map, or identifies an icon on the map which is selected by the user through a clicking or tapping input. When the obtaining unit 602 obtains the map selected by the user, the selecting includes a finger of the user staying over the icon for at least a preset time or clicking.

Figure 7:
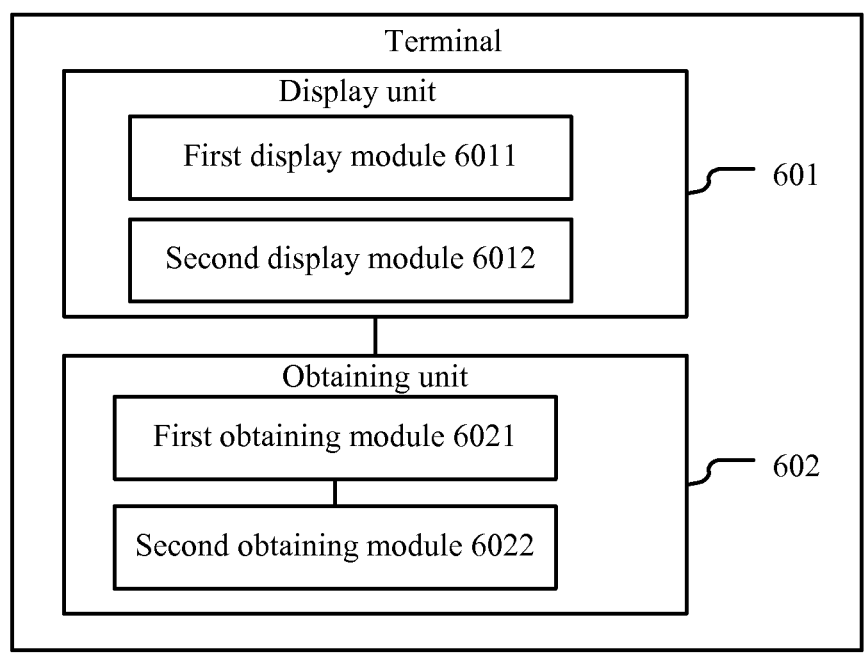
FIG. 7 is a schematic structural diagram of a map displaying device in accordance with some embodiments.

Further, optionally, as shown in FIG. 7, when the obtaining unit 602 obtains the icon corresponding to the location where the pointing input stays in the map, the obtaining unit 602 includes: a first obtaining module 6021, and a second obtaining module 6022.

In some embodiments, the first obtaining module 6021 is used to, when time that the pointing input stays still is longer than a preset time, obtain the location of the pointing input in the map.

Optionally, the preset staying time of the user's pointing input may be determined according to a specific product strategy. For example, the preset time may be any value ranging from 0 second to 1 second. If the preset time is 0.5 second, when the time for the pointing input staying still is longer than 0.5 second, the first obtaining module 6021 obtains the location of the pointing input in the map at this moment. Optionally, the location of the pointing input in the map may be indicated in a form of coordinates.

In some embodiments, the second obtaining module 6022 is used to obtain, according to the location of the pointing input, an icon in the map and corresponding to the location of the pointing input.

Further, optionally, as shown in FIG. 7, when the display unit 601 displays the relevant information of the material object through the floating layer, the display unit 601 includes: a first display module 6011, and a second display module 6012.

In some embodiments, the first display module 6011 is used to display the detailed relevant information of the material object through a transparent layer, and the transparent layer is superimposed upon the layer containing the map.

In some embodiments, the second display module 6012 is used to display the relevant information of the material object in the form of a floating window.

Further, optionally, the display unit 601 is further used to display the relevant information of the material object above the icon; display the relevant information of the material object below the icon; display the relevant information of the material object on a left side of the icon; display the relevant information of the material object on a right side of the icon; or superimpose the relevant information of the material object upon the icon.

Other details related to the device shown in FIG. 6 or FIG. 7 are described in other parts of the specification, e.g., with respect to FIGS. 1-5 and 8-12.

Figure 8:
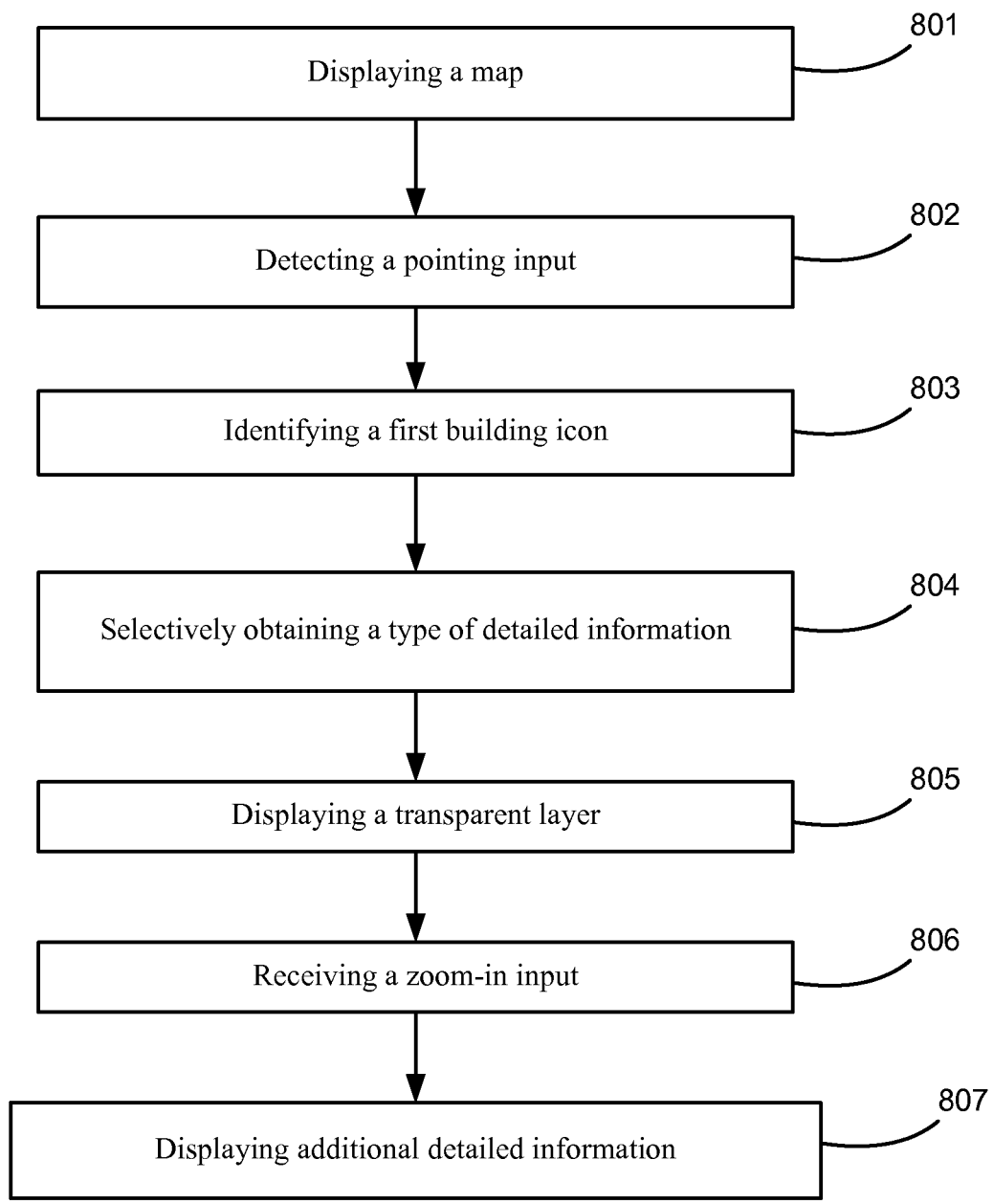
FIG. 8 is a flowchart of a map displaying method in accordance with some embodiments.
Figure 9:
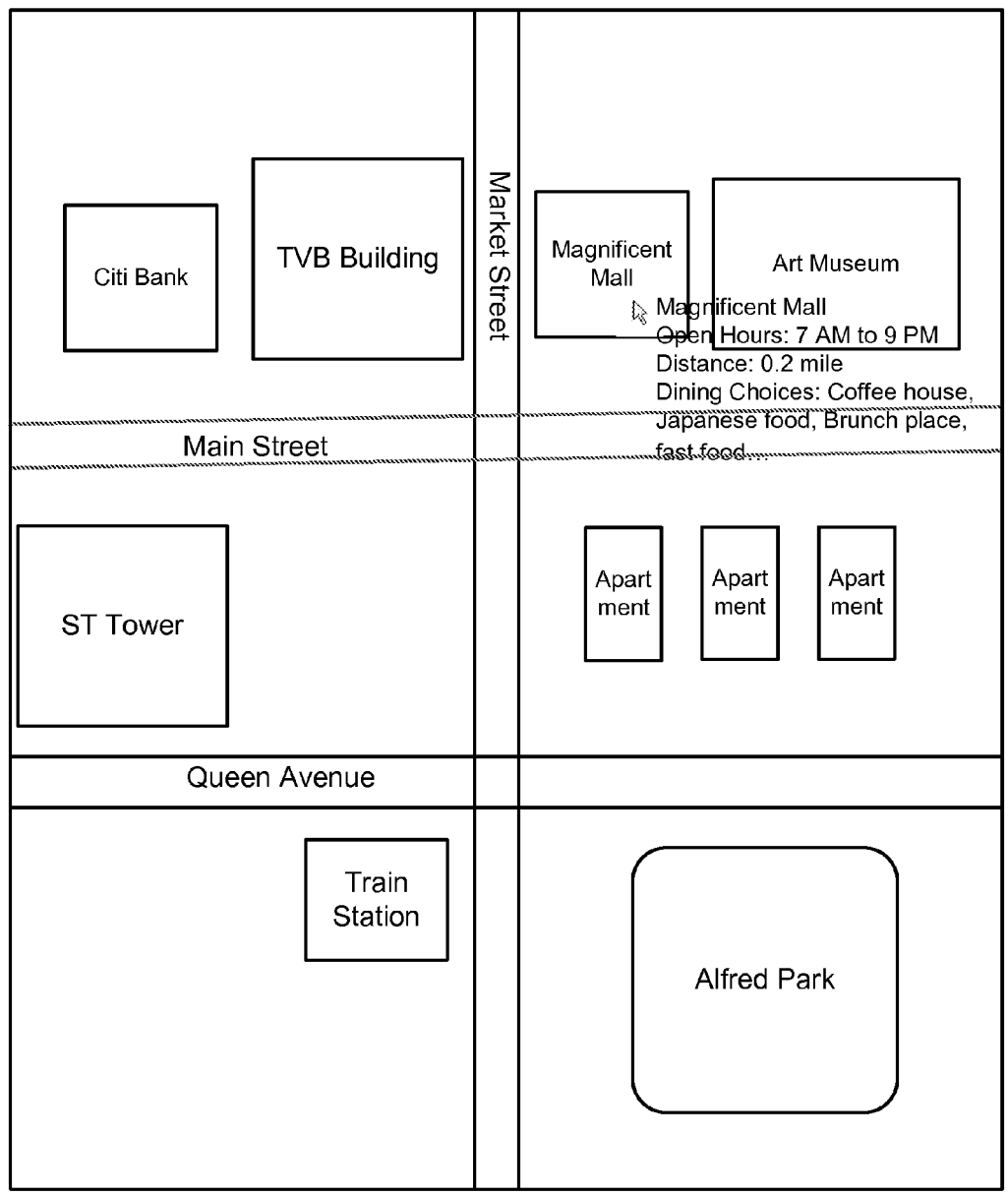
FIGS. 9-11 are maps displayed by a device in accordance with some embodiments.
Figure 10:
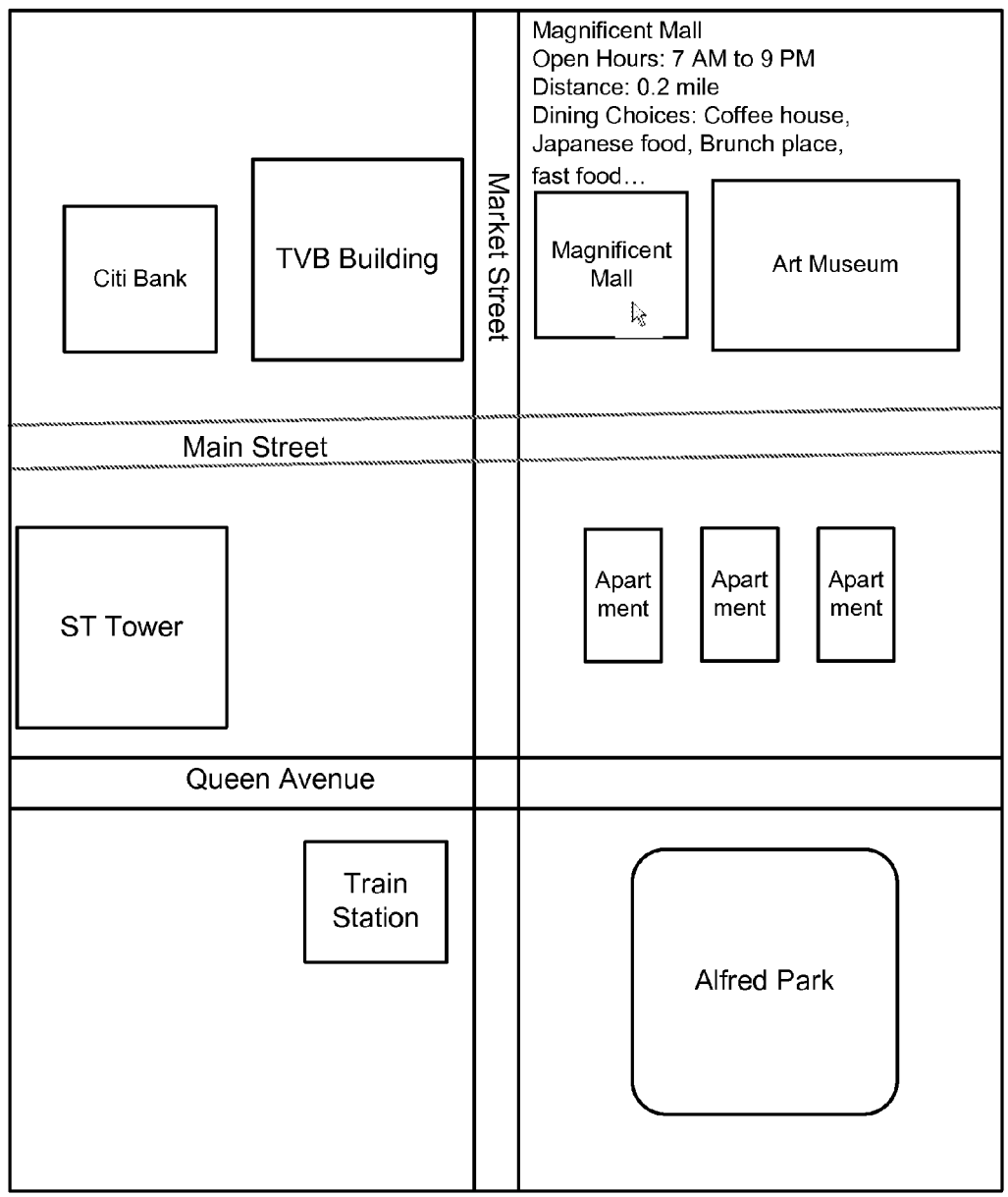
Figure 11:
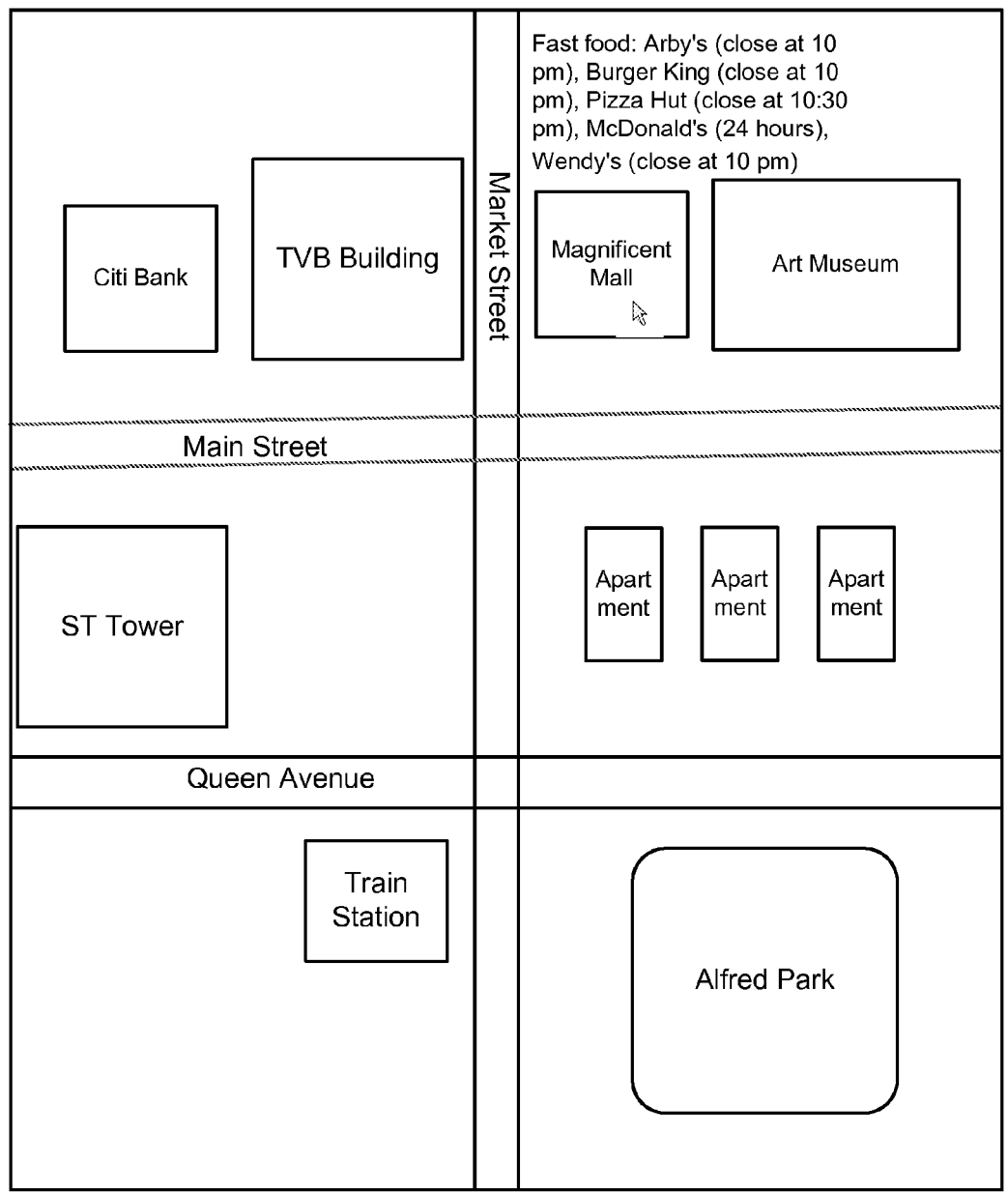

FIG. 8 is a flowchart of a map displaying method in accordance with some embodiments. The method is performed at a device having one or more processors and memory storing instructions for execution by the one or more processors. FIGS. 9-11 show maps displayed with the method illustrated in FIG. 8, in accordance with some embodiments.

In step 801, the device displays the map on a graphical user interface. In some embodiments, the displayed map includes a plurality of building icons each representing a respective building, as shown in FIGS. 9-11. For example, the device displays the map on its screen and the map is movable on the screen to display the area where a user wants the map to display. The definition of the "building icon" as described in this specification includes map icons for not only architectures such as houses, skyscrapers, high-rises, warehouses, but also other man-made places, such as parks, monuments, museums, stadium, police station, schools, universities, hospitals, court houses, farms, train stations, airports, sea ports, towers, bridges, roads, parking lots, garages, etc.

In step 802, in some embodiments, the device detects a pointing input at a respective position in the displayed map. In some embodiments, the pointing input is a mouse clicking when a cursor is placed at or in proximity to the respective position. In some embodiments, the pointing input is a cursor stays still at the respective position longer than a pre-set time period. In some embodiments, the pointing input is a touch input on a touch screen of the device provided by a finger or stylus.

In step 803, in some embodiments, the device identifies a first building icon associated with the respective position in the displayed map. In FIG. 9, the icon for magnificent mall is identified as the first building icon based on overlap and/or proximity between the cursor position and the position of the icon on the map. In some embodiments, a building icon is identified if the position of the pointing input is within the graphical boundary of the building icon. In some embodiments, the boundary of a building icon is slightly larger than visible outline of the building icon shown on the map, so that the building icon is identified when the cursor is moved in proximity to the building icon on the map. In this invention, a building refers to any man-made structures, such as houses, skyscrapers, high-rises, warehouses, parks, monuments, museums, stadium, police station, schools, universities, hospitals, court houses, farms, train stations, airports, sea ports, towers, bridges, roads, parking lots, garages, etc.

In step 804, in some embodiments, the device selectively obtains a respective type of detailed information on the respective building represented by the first building icon for display on the map. In some embodiments, detailed information is categorized into a plurality of types. In some embodiments, different types of detailed information respectively include the type of the respective building (e.g., police station, shopping mall, hospital, office building, recreational facility, transportation terminal, residential building, etc.), the address of the respective building (e.g., a street address of the building), organizations within the respective building (e.g., businesses, agencies, government departments, classes, etc.), the inner structure of the respective building (e.g., different levels of the building, different sub-blocks within a building complex, etc.), contact information of the organizations located within the building, the history of the building (e.g., when the building was built, and for what purposes, etc.), operating hours of the respective building and the organizations within the building, discount or promotion information for businesses within the respective building, website links of the organizations within the building, etc. In some embodiments, the selectively obtaining of the respective type of detailed information is based on each of or a combination of several types of information (e.g., various information describing the current context, and information known about the selected building icon) acquired by the device. In other words, even though several types of information are available for each icon displayed on the map, depending on the current context and the actual content of the information on the selected building icon, the device selectively displays some types of detailed information related to selected building icon that may be more relevant to the present context and thus may better meet the user's present interest.

In step 805, in some embodiments, the device displays a transparent layer over the displayed map, the transparent layer displaying the selected type of detailed information.

In some embodiments, the transparent layer is semi-transparent. In some embodiments, the semi-transparent layer has different colors. In some embodiments, the transparent layer is completely transparent and on the transparent layer a user can only see the selected detailed information.

In some embodiments, the selectively obtaining is in accordance with a respective distance between a current location of the device and a respective location associated with the respective building represented by the first building icon. In some embodiments, the device acquires the current location of the device through GPS or radio positioning technology. The device then calculates the distance between a location of the device and the first building.

In some embodiments, the selectively obtaining is in accordance with a determination that the respective distance between the current location of the device and the respective location associated with the respective building represented by the first building icon is greater than a predetermined threshold distance. In some embodiments, the device determines that the user is within walking distance to the building and the device obtains and displays the walking directions from the position of the device to the building. In some embodiments, the device determines that the user is not within walking distance from the first building and needs to take public transit or cars to get there, and accordingly obtains and displays the directions for using public transit and cars to get to the first building.

In some embodiments, the distance helps to determine what type of detailed information is obtained and displayed. In some embodiments, according to the distance, the device determines how much details need to be included in the content on the transparent layer. For example, in some embodiments, if the distance is relatively short (e.g., shorter than 1 mile), the type of the detailed information obtained by the device includes the inner structure of the building (e.g., the different levels of the building) and/or the names of the businesses located in the building (e.g., businesses located on each floor or sub-block of a mall). If the distance is relatively long (e.g., greater than 1 mile), the displayed information includes the contact information and main features of the building (e.g., the address of the building). In some embodiments, the type of information displayed is further based on the type of the first building. For example, if the building type is an office building, the transparent layer displays names and phone numbers of the businesses in the building if the device is within 1000 feet and displays the address of the building if the device is over 1000 feet. If the building is a shopping mall, the transparent layer displays names and phone numbers of the shops in the building if the device is over 1000 feet away, and displays coupons and promotion information if the device within 1000 feet of the shopping mall.

In some embodiments, the selected type of detailed information includes respective operating hours of the respective building represented by the first building icon, and where the selectively obtaining is in accordance with a determination that a current time is outside the operating hours of the respective building. For example, the building is a museum and its operating hours are 9 AM to 4 PM. When the building icon of the museum is identified at 4:10 PM, the user of the device is possibly either unaware of the operating hours or planning to visit the museum at a later time. The device optionally displays the operating hours in the transparent layer as a reminder. In some embodiments, the operating hours are displayed if the current time only a short time before the closing time of the building. For example, if the current time is 3:30, the device can display the operating hours to remind the user that the museum is about to close. In some embodiments, the device calculates the amount of time needed to travel from the user's current location to the location of the building, and if the current time plus the required travel time goes past the operating hours of the first building, the device displays the operating hours of the first building. If the current time is well within the operating hours of the first building, the device does not automatically display the operating hours of the first building in the initially displayed detailed information. The operating hours information may be displayed when the user select to view "more details" of the first building.

In some embodiments, selectively obtaining the respective type of detailed information is in accordance with a respective building type of the respective building represented by the first building icon. The first building icon can represent a theatre, a museum, a restaurant, a bank, a mall, an office building, etc. In some embodiments, when the first building icon represents a movie theatre, the device obtains and displays the time of movies for today. In some embodiments, the first building icon represents an office building, and the device obtains and displays the names of companies that have offices in the building. In some embodiments, the first building icon represents a mall and the device obtains and displays the names of organizations including brands of stores and restaurants.

In some embodiments, selectively obtaining the respective type of detailed information is in accordance with display preference settings. In some embodiments, the display preference includes the size of the transparent layer, the amount of content displayed, how to select the detailed information that is to be obtained and displayed. For example, a display preference may include that for any hotels and dining places, the reservation telephone numbers are obtained and displayed. In some embodiments, the display preference is indicative of the user's intent to search for a building with a preferred characteristic. In some embodiments, the preferred characteristic is a building that has a parking place. In some embodiments, the preferred characteristic is that the building opens before 9 AM. In some embodiments, the preferred characteristic is being close to a subway station. In some embodiments, the preferred characteristic includes that the searched-for building has a type of an organization operating within. For example, the preferred characteristic is that the building has an Italian restaurant.

In some embodiments, the device is configured to set the display preference according to the instructions of the user. In some embodiments, the display preference is set or changed according to search history of the map. For example, if the device has searched for coffee shop 30 seconds before, the device recognizes that the user is looking for a coffee shop and changes the display preference accordingly. Therefore, when the cursor points to a building with a coffee shop, the transparent layer displays the brand of the coffee shop among other detailed information. It is noted that, the device does not automatically display the information regarding the coffee shop initially, if the user had not performed a search for coffee shop recently.

Sometimes, the position of the pointing input is not directly on any building icon or that the selected building icon does not have the preferred characteristic. In some embodiments, the closest building with the preferred characteristic is suggested by the device, e.g., by highlighting the building icon. In some embodiments, all buildings within a certain distance that have the preferred characteristic are suggested to the user.

In some embodiments, when position of the pointing input is not directly on any building icon, the transparent layer displays the building icon that is both within certain distance on the map and relevant based on the current context. The current context includes prior search history, current location, current time, etc. When there are more than one building icon are both nearby and relevant, the transparent layer rotates through the multiple icons. In some embodiments, the multiple icons are highlighted at the same time. For example, from a combination of information discussed above, the device determines that a user is looking for a bar that is both near a certain position and opens through 2 a.m. When a user points to a position that is not associated with any building, the transparent layer highlights one by one the five bars that are both within 15 minute walk to the pointed position and open through 2 a.m.

In some embodiments, the location of the device, the current time, display preference and other information are used in combination with one another to strategically select the detailed information to be obtained and displayed. In some embodiments, for example, the device has calculated that a coffee shop takes at least 40 minutes to travel to and the closing time is 30 minute later. The device displays the operating hours in the transparent layer because the given the distance, the operating hours are potentially useful information for the user. In some embodiments, the display preference indicates that the user is looking for a Japanese restaurant. When the identified building does not have the Japanese restaurant, the map suggests other Japanese restaurants that both nearby the identified building and remain open long enough that the user has sufficient time to travel the distance to visit.

In some embodiments, the device automatically varies a relative lateral position between the transparent layer and the displayed map after a predetermined threshold time. From a user's view, the transparent layer moves relative to the map so that the content of the transparent layer does not always block the same area in the map. FIG. 10 shows an example of what the same map in FIG. 9 looks like after the device varies a relative lateral position between the transparent layer and the displayed map after a predetermined amount of time. In some embodiments, the device varies a relative lateral position between the transparent layer and the displayed map in response to a drag input received from a user. From a user's view, a user can drag the transparent layer and move it relative to the map. Also, a user can also drag the map and make it move relative to the transparent layer.

In some embodiments, as long as the pointing input stays in the same position, when the transparent layer moves relative to the map, the content of the transparent layer stays the same. The moving of the transparent layer facilitates a user's viewing of the map. In some embodiments, the transparent layer moves along with the pointing input, e.g., a cursor. The size, shape and content of the transparent layer are configured to change according to the new position of the pointing input. When the pointing input keeps moving in the map, the transparent layer keeps changing so that the user has a smooth experience of glancing in the map quickly.

In step 806, in some embodiments, the device receives a zoom-in input on the transparent layer in proximity to the first building icon. In some embodiments, the zoom-in and zoom-out inputs include user gestures, selecting of buttons and user voices. The zoom-in and zoom-out inputs are instructions of a user to change the detail level of the content of the transparent layer.

In step 807, in some embodiments, in response to the received zoom-in input, the device retrieves additional detailed information related to the selected type of detailed information and displays the additional detailed information in the transparent layer over a zoomed-in version of the displayed map. In some embodiments, the displayed detailed information includes types of all organizations that have offices in the first building. Upon receiving the zoom-in input directed at cloth stores, the transparent layer displays names of all the cloth stores. Upon receiving a zoom-in input directed at a particular cloth store, the transparent layer displays its telephone number, operating hours, the exact floor and location, discount information, etc. In some embodiments, in response to a zoom-out input, the transparent layer displays detailed information at a higher level, e.g., from information of a particular jewelry store to names of all jewelry stores. FIG. 11 illustrates the map displayed by the device after the device receives a zoom-in input directed at "fast food" in the map displayed in FIG. 10 in accordance with some embodiments.

In some embodiments, the zoom-in input is not directed at any particular type of information. Detailed information is categorized with several levels. In some embodiments, at first, the transparent layer displays higher level detailed information. Upon receiving the zoom-in input from a user, the transparent layer displays lower level detailed information. In some embodiments, the contact information and address of a building belongs to higher level detailed information while the names of business belong to lower level detailed information.

Figure 12:
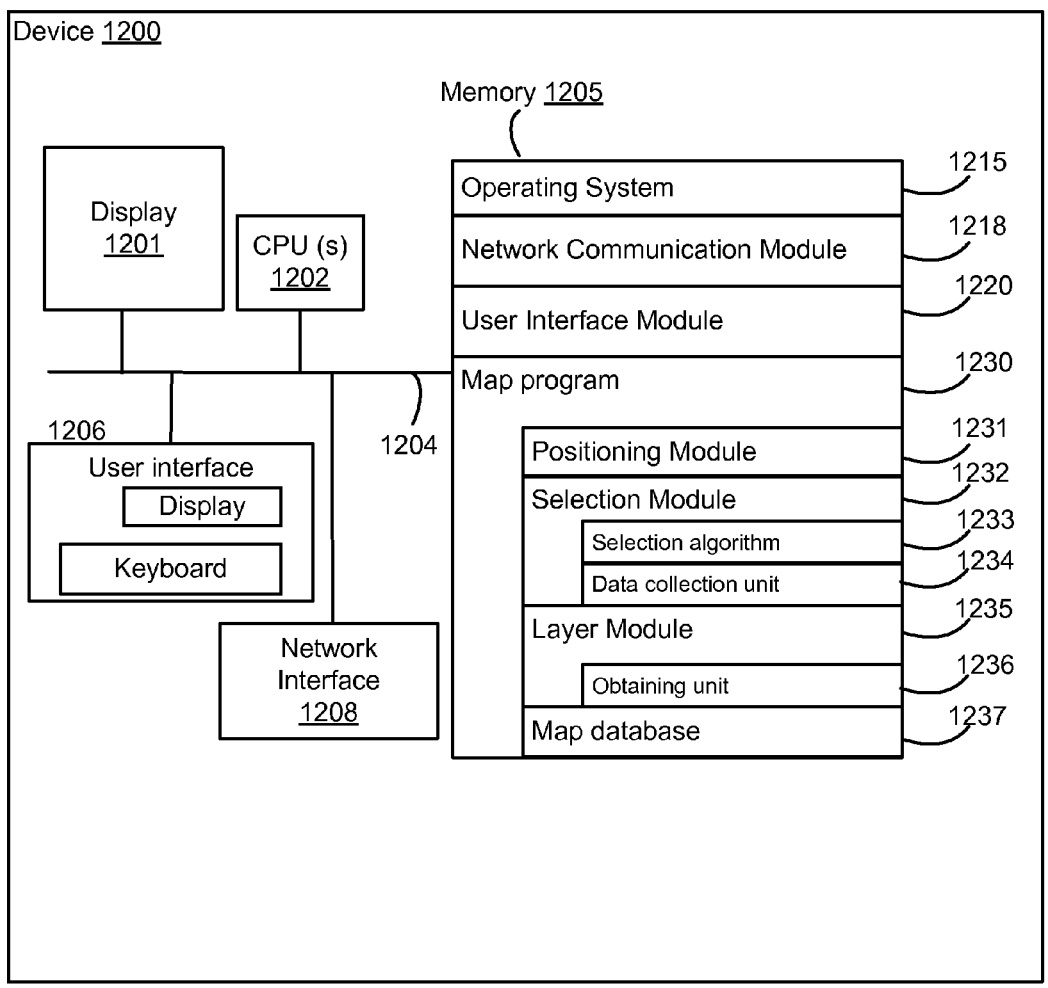
FIG. 12 is a schematic structural diagram of a map displaying device in accordance with some embodiments.

FIG. 12 is a diagram of an example implementation of a map displaying device in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the device 1200 includes one or more processing units (CPU's) 1202, one or more network or other communications interfaces 1208, a display 1201, memory 1205, and one or more communication buses 1204 for interconnecting these and various other components. The communication buses may include circuitry (sometimes called a chipset) that interconnects and controls communications between system components. The memory 1205 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1205 may optionally include one or more storage devices remotely located from the CPU(s) 1202. The memory 1205, including the non-volatile and volatile memory device(s) within the memory 1205, comprises a non-transitory computer readable storage medium.

In some implementations, the memory 1205 or the non-transitory computer readable storage medium of the memory 1205 stores the following programs, modules and data structures, or a subset thereof including an operating system 1215, a network communication module 1218, a user interface module 1220, and a map program 1230.

The operating system 1215 includes procedures for handling various basic system services and for performing hardware dependent tasks.

The network communication module 1218 facilitates communication with other devices via the one or more communication network interfaces 1208 (wired or wireless) and one or more communication networks, such as the internet, other wide area networks, local area networks, metropolitan area networks, and so on.

The user interface module 1220 is configured to receive user inputs through the user interface 1206.

The map program 1230 is configured to display a map on a graphical user interface of the device 1200. The map program 1230 comprises a positioning module 1231, a selection module 1232, a layer module 1235 and a map database 1237.

The positioning module 1231 is configured to acquire the current location of the device 1200. In some embodiments, the device 1200 is configured to receive data from a GPS system or a radio positioning system.

The selection module 1232 is configured to select a respective type of detailed information on the respective building that is to be displayed in a transparent layer in accordance with acquired information. The selection module 1232 comprises a selection algorithm 1233 and a data collection unit 1234. The data collection unit is configured to acquire information from other modules of the device 1200. In some embodiments, the acquired information includes current time, the location information from the positioning module 1231, the location information of the identified building, the display preference, etc.

The layer module 1235 is configured to display a transparent layer. The layer module 1235 comprises an obtaining module 1236. The obtaining module 1236 is configured to obtain the selected detailed information from the map database 1237.

The map database 1237 is configured to store all information related to the map, including the display preference and detailed information of buildings. In some embodiments, the map database 1237 is connected with a remote server and is configured to update the data of the map database 1237 with data from the remote server.

The embodiments of the present invention provide the device for displaying the map detailed information, and the device includes: the display unit, used to display the map, wherein the map includes at least one icon, and the icon is used to identify the material object; and the obtaining unit, used to obtain the icon indicated on the map and displayed by the display unit, where the obtaining unit is further used to obtain the relevant information of the material object corresponding to the icon, and the display unit is further used to display the relevant information of the material object through the floating layer. The solution provided in the embodiment of the present invention may automatically display detailed information of a building on a map corresponding to the staying location of the mouse, thereby lowering complexity of operations.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method of displaying detailed information on a map, comprising:
   at a device having one or more processors and memory storing instructions for execution by the one or more processors:
   displaying the map on a graphical user interface of the device, the displayed map including a plurality of building icons each representing a respective building;
   detecting a pointing input at a respective position in the displayed map;
   identifying a first building icon associated with the respective position in the displayed map;
   selectively obtaining a respective type of detailed information on the respective building represented by the first building icon for display on the map, wherein the selectively obtaining is in accordance with a respective distance between a current location of the device and a respective location associated with the respective building represented by the first building icon; and displaying a transparent layer over the displayed map, the transparent layer displaying the selected type of detailed information.

2. The method of claim 1, wherein selectively obtaining the respective type of detailed information is further in accordance with a respective building type of the respective building represented by the first building icon.

3. The method of claim 1, wherein the selected type of detailed information includes directions from the current location of the device to the respective location associated with the respective building represented by the first building icon, and wherein the selectively obtaining is in accordance with a determination that the respective distance between the current location of the device and the respective location associated with the respective building represented by the first building icon is greater than a predetermined threshold distance.

4. The method of claim 1, wherein the selected type of detailed information includes respective operating hours of the respective building represented by the first building icon, and wherein the selectively obtaining is in accordance with a determination that a current time is outside the operating hours of the respective building.

5. The method of claim 1, further comprising:
receiving a zoom-in input on the transparent layer in proximity to the first building icon; and
in response to the received zoom-in input:
retrieving additional detailed information related to the selected type of detailed information; and
displaying the additional detailed information in the transparent layer over a zoomed-in version of the displayed map.

6. The method of claim 1, wherein displaying the transparent layer over the displayed map further comprises:
automatically varying a relative lateral position between the transparent layer and the displayed map after a predetermined threshold time.

7. The method of claim 1, further comprising:
varying a relative lateral position between the transparent layer and the displayed map in response to a drag input received from a user.

8. A device for displaying detailed information on a map, comprising:
one or more processors; and
memory storing one or more programs for execution by the one or more processors, the one or more programs including instructions for:
displaying the map on a graphical user interface of the device, the displayed map including a plurality of building icons each representing a respective building;
detecting a pointing input at a respective position in the displayed map;
identifying a first building icon associated with the respective position in the displayed map;
selectively obtaining a respective type of detailed information on the respective building represented by the first building icon for display on the map, wherein the selectively obtaining is in accordance with a respective distance between a current location of the device and a respective location associated with the respective building represented by the first building icon; and
displaying a transparent layer over the displayed map, the transparent layer displaying the selected type of detailed information.

9. The device of claim 8, wherein selectively obtaining the respective type of detailed information is further in accordance with a respective building type of the respective building represented by the first building icon.

10. The device of claim 8, wherein the selected type of detailed information includes directions from the current location of the device to the respective location associated with the respective building represented by the first building icon, and wherein the selectively obtaining is in accordance with a determination that the respective distance between the current location of the device and the respective location associated with the respective building represented by the first building icon is greater than a predetermined threshold distance.

11. The device of claim 8, wherein the selected type of detailed information includes respective operating hours of the respective building represented by the first building icon, and wherein the selectively obtaining is in accordance with a determination that a current time is outside the operating hours of the respective building.

12. The device of claim 8, wherein the one or more programs further include instructions for:
receiving a zoom-in input on the transparent layer in proximity to the first building icon; and
in response to the received zoom-in input:
retrieving additional detailed information related to the selected type of detailed information; and
displaying the additional detailed information in the transparent layer over a zoomed-in version of the displayed map.

13. The device of claim 8, wherein displaying the transparent layer over the displayed map further comprises:
automatically varying a relative lateral position between the transparent layer and the displayed map after a predetermined threshold time.

14. The device of claim 8, wherein the one or more programs further include instructions for:
varying a relative lateral position between the transparent layer and the displayed map in response to a drag input received from a user.

15. A non-transitory computer readable storage medium having instructions stored thereon, the instructions, when executed by one or more processors, cause the processors to perform operations comprising:
displaying the map on a graphical user interface of the device, the displayed map including a plurality of building icons each representing a respective building;
detecting a pointing input at a respective position in the displayed map;
identifying a first building icon associated with the respective position in the displayed map;
selectively obtaining a respective type of detailed information on the respective building represented by the first building icon for display on the map, wherein the selectively obtaining is in accordance with a respective distance between a current location of the device and a respective location associated with the respective building represented by the first building icon; and
displaying a transparent layer over the displayed map, the transparent layer displaying the selected type of detailed information.

16. The computer-readable medium of claim 15, wherein selectively obtaining the respective type of detailed information is further in accordance with a respective building type of the respective building represented by the first building icon.

17. The computer-readable medium of claim 15, wherein the selected type of detailed information includes directions from the current location of the device to the respective location associated with the respective building represented by the first building icon, and wherein the selectively obtaining is in accordance with a determination that the respective distance between the current location of the device and the respective location associated with the respective building represented by the first building icon is greater than a predetermined threshold distance.

18. The computer-readable medium of claim 15, wherein the selected type of detailed information includes respective operating hours of the respective building represented by the first building icon, and wherein the selectively obtaining is in accordance with a determination that a current time is outside the operating hours of the respective building.

19. The computer-readable medium of claim 15, wherein the one or more programs further include instructions for:
- receiving a zoom-in input on the transparent layer in proximity to the first building icon; and
- in response to the received zoom-in input:
  - retrieving additional detailed information related to the selected type of detailed information; and
  - displaying the additional detailed information in the transparent layer over a zoomed-in version of the displayed map.

20. The computer-readable medium of claim 15, wherein displaying the transparent layer over the displayed map further comprises:
- automatically varying a relative lateral position between the transparent layer and the displayed map after a predetermined threshold time.

\* \* \* \* \*